United States Patent
Panje et al.

(10) Patent No.: US 9,253,528 B2
(45) Date of Patent: Feb. 2, 2016

(54) METHOD AND APPARATUS FOR DETERMINING A MEDIA ENCODING FORMAT OF A MEDIA STREAM

(71) Applicant: MOTOROLA MOBILITY LLC, Libertyville, IL (US)

(72) Inventors: Krishna Prasad Panje, Bangalore (IN); Sundar Murthy Tumuluru, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 634 days.

(21) Appl. No.: 13/664,456

(22) Filed: Oct. 31, 2012

(65) Prior Publication Data
US 2014/0119429 A1 May 1, 2014

(51) Int. Cl.
| H04N 7/26 | (2006.01) |
| H04N 21/434 | (2011.01) |
| H04N 21/4425 | (2011.01) |
| H04N 21/81 | (2011.01) |
| H04N 7/24 | (2011.01) |

(52) U.S. Cl.
CPC ......... *H04N 21/434* (2013.01); *H04N 21/4425* (2013.01); *H04N 21/81* (2013.01)

(58) Field of Classification Search
CPC . H04N 7/50; H04N 7/26244; H04N 7/26271; H04N 7/26053; H04N 7/26941; G09F 19/22; E01F 9/065; F16G 15/06; G01N 31/222; G01P 13/00
See application file for complete search history.

(56) References Cited

U.S. PATENT DOCUMENTS

| 7,539,258 B2 | 5/2009 | Nakajima | |
| 7,948,907 B2 * | 5/2011 | Wang | H04B 1/3805 370/252 |

(Continued)

FOREIGN PATENT DOCUMENTS

| CN | 101654187 A | 2/2011 | |
| CN | 101964187 A * | 2/2011 | H04L 29/00 |
| JP | 2002111636 A | 4/2002 | |

(Continued)

OTHER PUBLICATIONS

Patent Cooperation Treaty, International Search Report and Written Opinion of the International Searching Authority for International Application No. PCT/US2013/060830, Jan. 23, 2014, 20 pages.

(Continued)

*Primary Examiner* — Sath V Perungavoor
*Assistant Examiner* — Howard D Brown, Jr.
(74) *Attorney, Agent, or Firm* — Lowenstein Sandler LLP

(57) ABSTRACT

A device and a method are disclosed. The device contains a network interface configured to receive a media stream, a processing device coupled to the network interface and configured to implement the method to determine an unknown media encoding format of a media stream, and a decoder device configured to decode media frames of the media stream.

20 Claims, 6 Drawing Sheets

(56) References Cited

U.S. PATENT DOCUMENTS

| | | |
|---|---|---|
| 2003/0032419 A1 | 2/2003 | Shibasaki et al. |
| 2007/0058730 A1* | 3/2007 | Bowra ............... H04N 21/2389 375/240.28 |
| 2008/0022320 A1* | 1/2008 | Ver Steeg ........... H04N 21/2353 725/78 |
| 2008/0152016 A1* | 6/2008 | Nagahara ................. H04N 5/76 375/240.26 |
| 2011/0022399 A1 | 1/2011 | Lien |
| 2012/0195362 A1* | 8/2012 | Benno ................... H04N 21/222 375/240.01 |
| 2014/0119429 A1* | 5/2014 | Panje ................... H04N 21/434 375/240.02 |

FOREIGN PATENT DOCUMENTS

| | | | |
|---|---|---|---|
| JP | 2011-085643 A * | 4/2011 | ............. H04N 21/81 |
| JP | 2011085643 A | 4/2011 | |
| WO | 02069595 A2 | 9/2002 | |

OTHER PUBLICATIONS

Patent Cooperation Treaty, International Search Report International Application No. PCT/US2013/060830, Jan. 23, 2014, 20 pages.

* cited by examiner

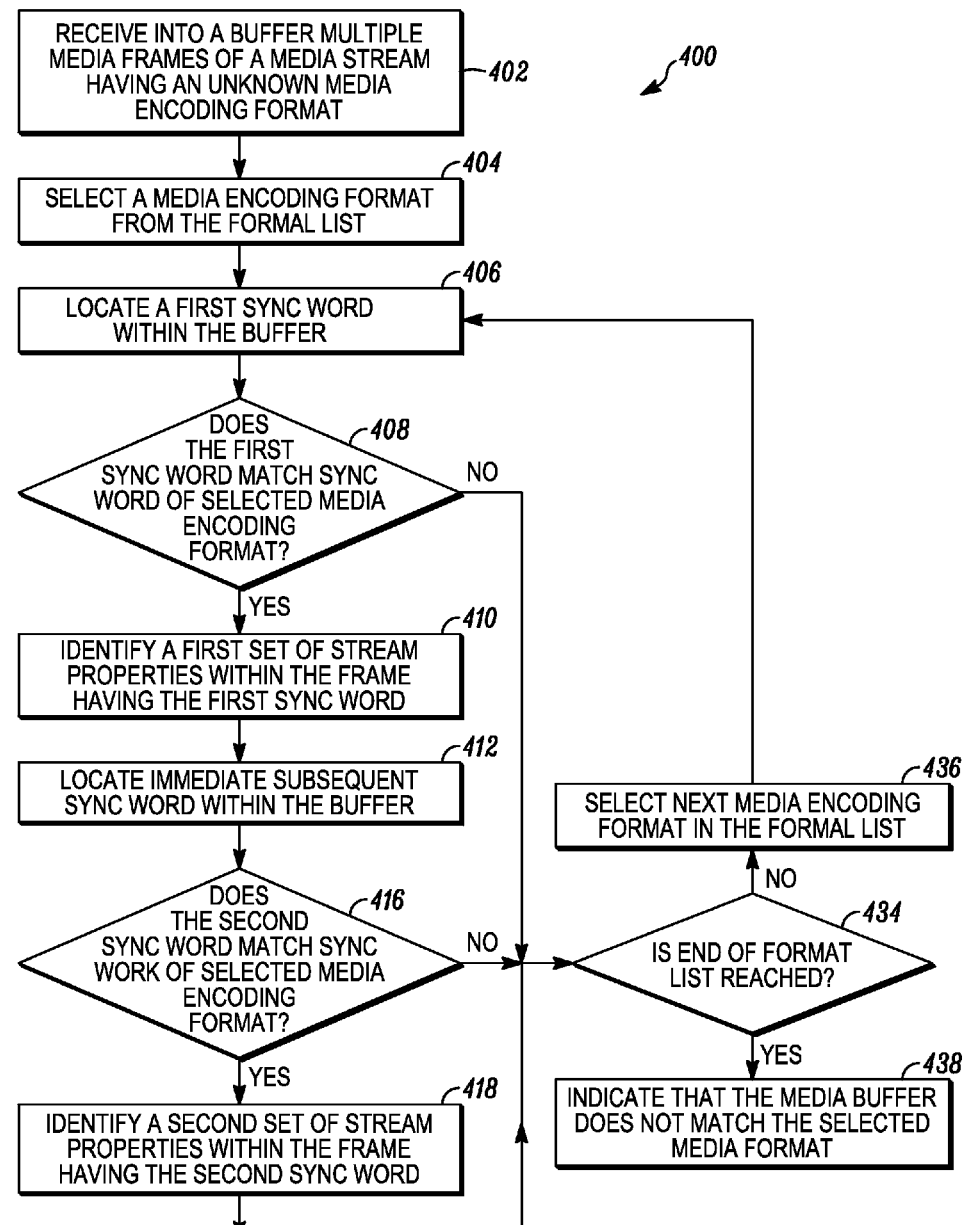

METHOD AND APPARATUS FOR DETERMINING A MEDIA ENCODING FORMAT OF A MEDIA STREAM

FIELD

The present disclosure relates generally to detection of one or more multimedia streams having an unknown media encoding format and more particularly to determining the media encoding format of the one or more multimedia streams.

BACKGROUND

Determining a media encoding format (also referred to herein simply as a format or media format) for a media stream (for instance a multimedia stream) is required before content playback can begin. Knowing the format of the media stream allows a receiving device to configure one or more decoders to decode the media stream for content playback. As is known in the art, the format of the media stream can be detected using file extensions contained in the media stream. However, in some instances the file extensions are abstracted by downloading servers that aggregate media and offer it for downloading to users. Also, as is known in the art, the format of the media stream can be determined if the downloading server provides a Multipurpose Internet Mail Extension (MIME) type to the receiving device before download so that the receiving device can configure its one or more decoders. However, MIME types are not supported by all downloading servers. In some cases it is also possible that the media format for the media content may change midstream (due to media insertions) while being streamed or downloaded from the server. So, the receiving device also needs to handle such a midstream format change situation without user intervention.

Accordingly, there is a need for a novel method and apparatus for determining a media encoding format of a media stream.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
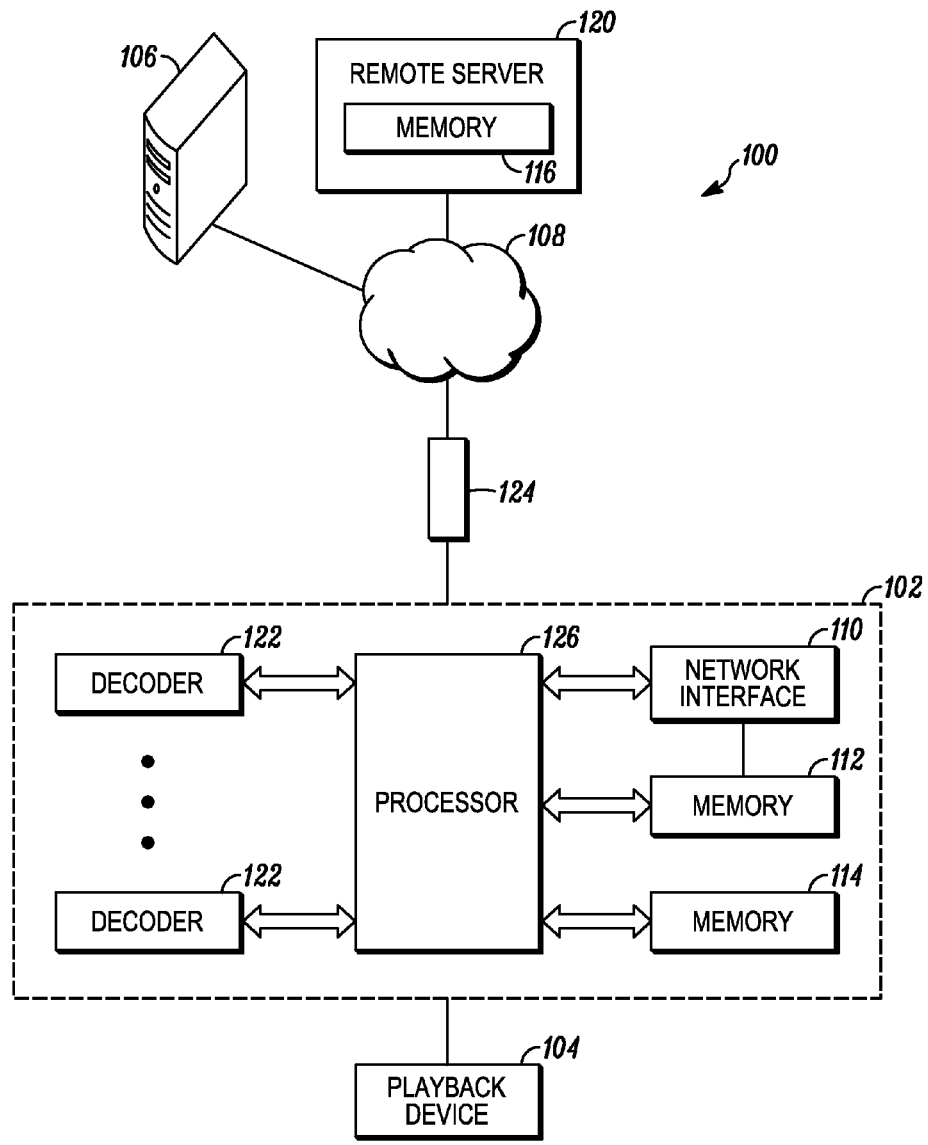
FIG. 1 is a block diagram of a system that includes a media device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a method for determining a media encoding format of a media stream is presently disclosed. The method comprises: storing a portion of a media stream having an unknown media encoding format within a buffer, wherein the portion of the media stream comprises multiple media frames; selecting a first media encoding format from a format list comprising a plurality of media encoding formats, wherein each media encoding format in the format list has an associated known sync word; for a subset of the multiple media frames, comparing a sync word in the media frame to a first sync word associated with the first media encoding format; when the sync word included in each media frame of a first plurality of media frames, comprising the subset of the multiple media frames, matches the first sync word, comparing a set of media stream properties from each media frame of the first plurality of media frames; and when the sets of media stream properties from each media frame of the first plurality of media frames match, determining the unknown media encoding format of the media stream to be the first media encoding format.

Pursuant to another embodiment, a media device for determining a media encoding format of a media stream is presently disclosed. The media device comprises: a network interface configured to communicate with a server to receive a media stream having an unknown media encoding format; memory coupled to the network interface and configured to store a portion of the media stream, which comprises multiple media frames; and a processing device coupled to the memory and configured to: select a first media encoding format from a format list comprising a plurality of media encoding formats, wherein each media encoding format in the format list has an associated known sync word; for a subset of the multiple media frames, compare a sync word in the media frame to a first sync word associated with the first media encoding format; when the sync word included in each media frame of a first plurality of media frames, comprising the subset of the multiple media frames, matches the first sync word, compare a set of media stream properties from each media frame of the first plurality of media frames; and when the sets of media stream properties from each media frame of the first plurality of media frames match, determine the unknown media encoding format of the media stream to be the first media encoding format; and a first decoder device coupled to the processing device and configured to decode media frames encoded with the first media encoding format.

Pursuant to another embodiment, a non-transient computer-readable storage element having computer readable code stored thereon for programming a computer within a media device to perform a method for determining a media encoding format of a media stream is presently disclosed. The method comprises: storing a portion of a media stream having an unknown media encoding format within a buffer, wherein the portion of the media stream comprises multiple media frames; selecting a first media encoding format from a format list comprising a plurality of media encoding formats, wherein each media encoding format in the format list has an associated known sync word; for a subset of the multiple media frames, comparing a sync word in the media frame to a first sync word associated with the first media encoding format; when the sync word included in each media frame of a first plurality of media frames, comprising the subset of the multiple media frames, matches the first sync word, comparing a set of media stream properties from each media frame of the first plurality of media frames; and when the sets of media stream properties from each media frame of the first plurality of media frames match, determining the unknown media encoding format of the media stream to be the first media encoding format.

Referring now to the drawings, and in particular FIG. 1, a system that includes a media device in accordance with some embodiments is shown at 100. We turn now to a brief description of the system elements that are shown in FIG. 1. The system 100 includes a content server 106 for storing media used to produce one or more media streams 124, a remote server 120, a media device 102 for decoding the media stream 124, and a playback device 104 for presenting (i.e., playing) the media contained in the media stream 124. Only a limited number of system elements 102-106 and 120 are shown for ease of illustration, but additional such elements may be included in the system 100. Moreover, other components that may be needed for a commercial embodiment of the system 100 are omitted from the drawing for clarity in describing the enclosed embodiments.

"Adapted," "operative" or "configured" as used herein means that the indicated devices are implemented using hardware and in some implementations software elements that, when programmed, form the means for the device to implement its desired functionality. For example, media device 102 is adapted or configured with functionality in accordance with embodiments of the present disclosure as described in detail below with respect to the remaining figures. More particularly, as shown in FIG. 1, the media device 102 is configured with a plurality of decoders (also referred to herein as decoder devices) 122, a processor 126 coupled to the plurality of decoders, a network interface 110 coupled to the processor 126, a buffer 112 coupled to the network interface 110 and to the processor 126, and a memory 114 coupled to the processor 126. Since the buffer 112 is simply a portion of physical memory storage used to temporarily hold data while it is being moved from one place to another, the buffer 112 can be a part of the physical hardware of the memory 114 or included in separate memory hardware. In an embodiment, memory 114 contains at least one additional buffer configured to temporarily store data such stream properties and is further configured to store software and other data needed for the functioning of the media device 102.

As used herein, a media stream is a continuous stream of encoded media (also referred to herein as content) that is transmitted over a network, and can be a live media stream or video on demand (VOD). The media contained within the media stream can be one type of data (e.g., audio or video data) or a combination of multiple types of data (i.e., a multimedia stream such as one containing both audio and video data). Further, the media within a media stream can contain different encoding formats, for example an audio/visual content with a midstream encoding format change for audio might be from AC3 to MP3. Accordingly, in an illustrative implementation, the media stream is a video stream, which contains only video data as its payload. In another implementation, the media stream is an audio stream, which contains only audio data as its payload. In a further implementation, the media stream is a video and audio stream, which contains both audio and video data as its payload.

The media device 102 is configured to at least: decode one or more media streams that comprise media that is encoded with a media encoding format; and provide a decoded signal that can be used to visually and/or audibly present the content to a user (i.e., a listener and/or viewer). The playback device 104 is configured with components (not shown) such as speakers and a display screen to receive the decoded signal and present the content to the user. In one embodiment, the media device 102 and playback device 104 are separate devices, such as when the media device 102 is a set-top box, and the playback device 104 is a television. In another embodiment, the playback device hardware and functionality is integrated with the media device 102, such as when the media device 102 is a television. However, the type of media device 102 does not limit the scope of the present teachings.

In one embodiment, each decoder 122 is configured to decode media streams (e.g., 124 as shown in FIG. 1), each having content that was encoded using a different media encoding format. As such, the media device 102 is configured to decode different media streams, each having content that was encoded using one of a plurality of media encoding formats, such as formats 328, 344 and 354 shown in FIG. 3 and described in detail below. The processor 126 is configured to identify the media encoding format of a media stream 124 and select the proper decoder 122 or properly configure the decoder 122 based on the identified media encoding format of the media stream 124.

As shown, the media device 102 includes multiple separate decoder devices 122 each configured to decode media streams having content that was encoded using a different media encoding format. More particularly, a first decoder device 122 coupled to the processing device 126 is configured to decode media frames encoded with a first media encoding format; a second decoder device 122 coupled to the processing device 126 is configured to decode media frames encoded with a second (different) media encoding format; and so on. However, in an alternate embodiment, the media device 102 includes at least one decoder device that is configured to decode media streams that were encoded using multiple media encoding formats. Namely, at least one decoder device 122 coupled to the processing device 126 is configured to decode media frames encoded with a first or a second (different) media encoding format.

The processor 126 and decoder device 122 may be partially implemented in hardware and, thereby, programmed with software, firmware logic or code for performing functionality described by reference to FIGS. 2-5; and/or the processor 126 and decoder device 122 may be completely implemented in hardware, for example, as a state machine or ASIC (application specific integrated circuit). The buffer 112 and memory devices 114, 116 can comprise short-term and/or long-term hardware storage of information needed for the functioning of the media device 102. The memory 114 may further store software or firmware for programming the processor 126 and decoders 122 with the logic or code needed to perform their functionality, including functionality described by reference to FIGS. 2-5.

The network interface 110 is used for passing signaling, also referred to herein as messaging (e.g., messages, packets, datagrams, frames, superframes, and the like), containing control information and media between the media device 102 and other elements of the system 100. The implementation of the network interface 110 depends on the specific type of network, i.e., wired and/or wireless, to which the media device 102 is connected. For example, a network interface that supports wired links and communications is referred to herein as a wired interface, and a network interface that supports wireless links and communications is referred to herein as a wireless interface. Examples of wired interfaces include Ethernet, T1, USB interfaces, etc. Examples of wireless interfaces include wireless protocols and associated hardware that support technologies including, but not limited to, Long Term Evolution (LTE), Code Division Multiple Access (CDMA), Global System for Mobile Communications (GSM), Wi-Fi, Institute of Electrical and Electronics Engineers (IEEE) 802.11, Bluetooth®, etc.

Where the media device 102 supports wireless communications, the network interface 110 includes components including processing, modulating, and transceiver (i.e., radio) components that are operable in accordance with any one or more standards or proprietary air interfaces, wherein some of the functionality of the processing, modulating, and transceiver components may be performed by means of the processor 126 through programmed logic such as software applications or firmware stored on the memory device 114 of the media device 102 or through hardware.

In one particular embodiment, the network interface 110 within the media device 102 is configured to receive a media stream 124 (shown in FIG. 1) over a network such as the Internet 108. A different network might be used such as a local area network (LAN). An encoder in a source device or content provider (e.g., the server 106) encodes the media stream using a selected media encoding format (either standard or proprietary), which defines a protocol scheme used to encode (and likely compress) and decode media such as audio and/or video. The media device 102 receives the media stream 124 from any content provider or source device. In the embodiment shown in FIG. 1, the content server 106 provides the media stream 124 through the internet 108.

In some instances, the media encoding format of the media stream is "unknown" to the media device 102, meaning that the media device 102 cannot discern the media encoding format solely from information sent within or contemporaneously with the media stream. In such instances, the media stream is said to have an "unknown media encoding format" from the perspective of the media device 102, for the purposes of these teachings. When the media stream has an unknown media encoding format, the media device 102 is configured, in accordance with embodiments of the present disclosure, to identify or determine the media encoding format used to encode content within the media stream 124 in order to decode the media stream 124 content to play for a user or viewer.

Figure 2:
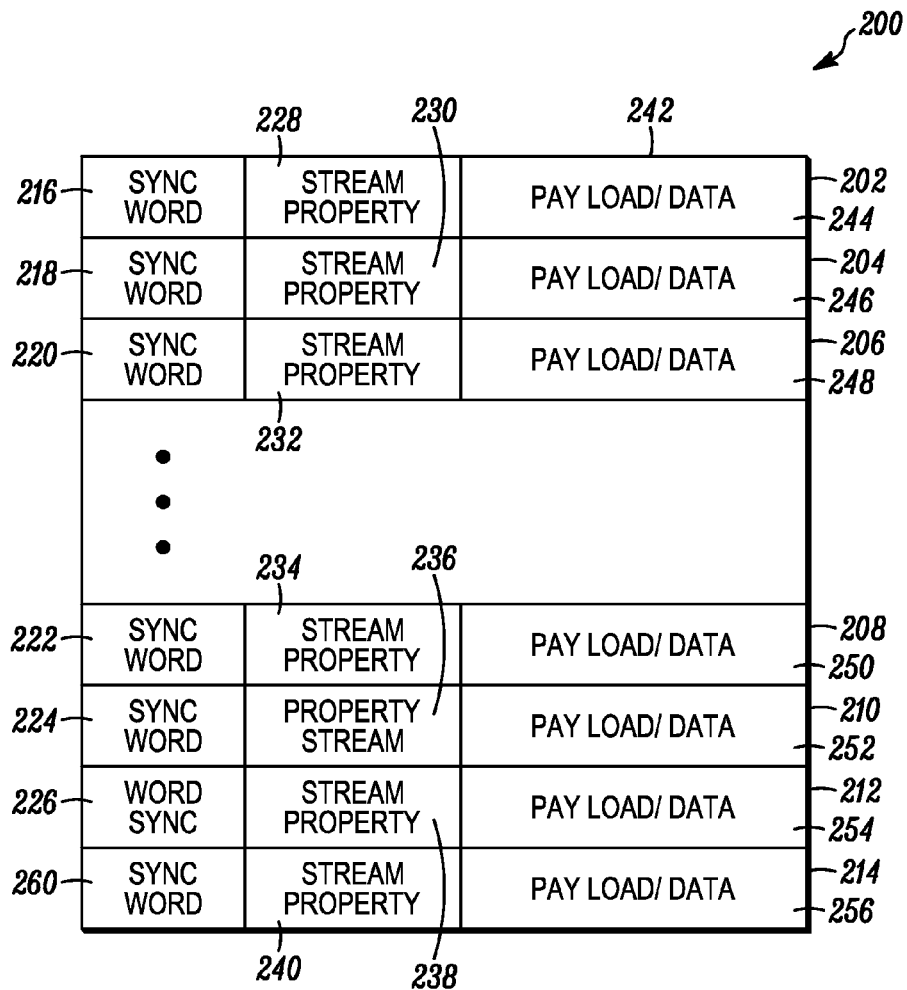
FIG. 2 is a block diagram of a media stream in accordance with some embodiments.

Referring now to FIG. 2, a media stream portion 200 (e.g., of the media stream 124) encoded using an unknown media format comprises multiple frames 202-214. Each frame 202-214 contains at least one sync word 216-226, 260, respectively, at least one stream property 228-240, respectively, and payload (media or content) 242-256, respectively. In accordance with the present teachings, media device 102 uses the sync words 216-226, 260 and sync words with received media frames and uses stream properties within the received media frames and, in an embodiment, also uses the stream properties 228-240 to determine the unknown media encoding format of the media stream 200 and to, thereby, decode the media stream portion 200 and play the content 242-256 for the user of the media device 102. As used herein, a sync word (also referred to in the art as a "syncword") is a string of characters that is used to synchronize an incoming transmission to enable proper decoding of data within the transmission. A frame means a formatted block of data for transmission over a communication network (for instance, a frame carried over a packet network is referred to as a packet). A media stream property (or "stream property" for short), as used herein, is information within a header of a media frame of any particular format (once determined) that does not change (i.e., remains constant) for that particular format until the media format changes.

The buffer 112 is configured to store at least a portion of the media stream 124. A sequence of media frames within the media stream is stored based on a "sliding window" approach meaning that as media frames within the buffer are decoded, these decoded media frames are purged from the buffer and replaced with the next media frames in the sequence within the media stream. Moreover, at least one of the buffer 112, the memory 114 or a memory 116 within the remote server 120 stores a plurality of media encoding formats that are used to determine the unknown media encoding format of the media stream 124 in order to decode the media stream. The plurality of media encoding formats comprise, for example, mp3 (Moving Picture Experts Group-1 (MPEG-1) layer-3) format, Advance Audio Coding (AAC) (MPEG-4 AAC with Audio Data Transport Stream (ADTS) header) format, and/or Audio Coding3 (AC3) format. Other audio and/or video formats can also be included in the plurality of media encoding formats.

Figure 3:
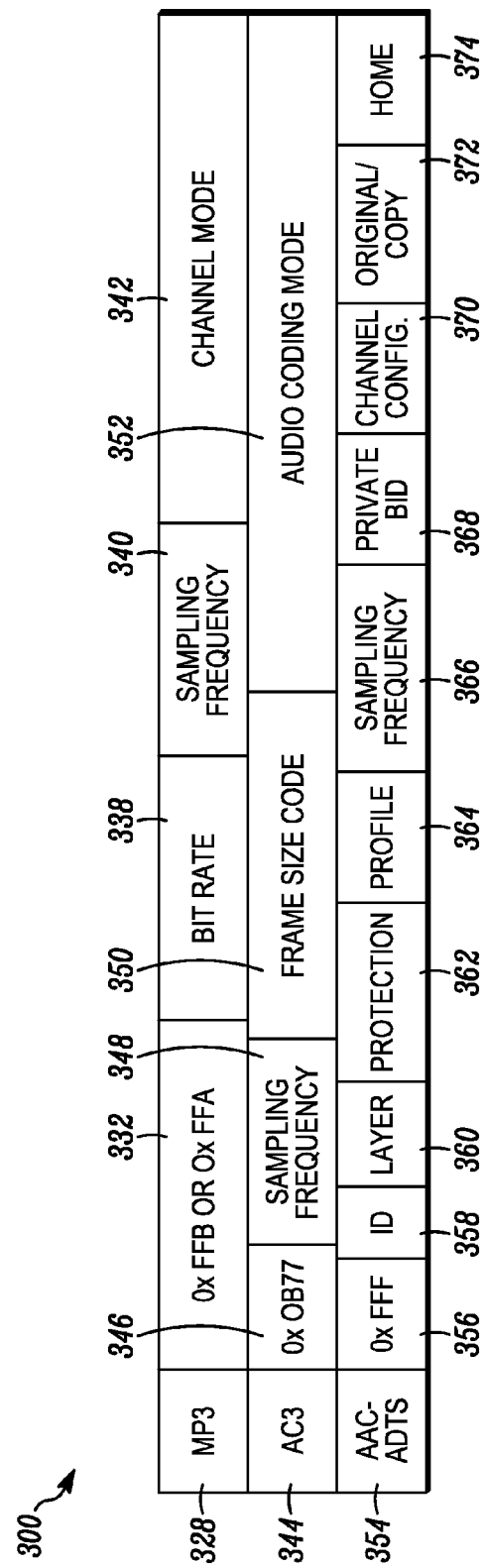
FIG. 3 is a block diagram of a format list in accordance with some embodiments.

Referring to FIG. 3, shown therein is a format list 300 in accordance with some embodiments. The format list 300 contains indications of multiple media encoding formats and is stored in memory that is accessible to the media device 102. For example, the format list 300 is stored in the memory 114 and/or the remote memory 116. In this case, the format list 300 indicates (via the stored information) three encoding formats, mp3 format 328, AC3 format 344, and AAC-ADTS format 354, wherein at least some of the information in the format list 300 is used to determine an unknown media format of a media stream to enable the decoder(s) 122 to decode media streams. However, any suitable media encoding format can be stored for such use. In addition, the format list can be a static list that does not change or can, alternatively, be configurable to allow a user or administrator to remove one or more media encoding formats and add one or more additional media encoding formats. Moreover, as shown, the format list includes sync words and media stream properties for each media encoding format indicated in the list. However, alternatively, the format list indicates only the sync words for the formats contained therein.

The mp3 format 328 comprises a sync word 332 and stream properties 338-342. The stream properties 338-342 are fixed fields within each frame header that indicate bit rate (338), sampling frequency (340) and channel mode (342). In one embodiment, the sync word 332 comprises first 12 bits that are binary 1's (1111 1111 1111=0xFFF in hexadecimal). The $13^{th}$ bit is used to denote the version of the format 328. For example, a binary 1 for the $13^{th}$ bit stands for MPEG1. The $14^{th}$ and $15^{th}$ bits denote layer. Table 1 below is used to identify layers:

TABLE 1

| $14^{th}$ and $15^{th}$ bits | Layer |
| --- | --- |
| 00 | Reserved |
| 01 | Layer III |
| 10 | Layer II |
| 11 | Layer I |

The least significant $16^{th}$ bit indicates if error protection is enabled or not. This bit could either be 1 or 0. In one embodiment, the least significant $16^{th}$ bit is set to 1 (indicating error protection is enabled) and the sync word 332 is 0xFFFB for the mp3 format 328. In another embodiment, the least significant $16^{th}$ bit is set to 0 (indicating error protection is disabled) and the sync word 332 is 0xFFFA for the mp3 format 328.

The AC3 format 344 comprises a sync word 346 and stream properties 348-352. In one embodiment, the sync word 346 is 16 bits long and has a value 0x0B77. The stream properties 348-352 are fixed fields within each frame header that indicate sampling frequency (344), a frame size code (350) and an audio coding mode (352).

The AAC-ADTS format 354 comprises a sync word 356 and stream properties 358-374. In one embodiment, the AAC-ADTS format 354 contains fixed and variable headers. The variable header contains information that changes from one frame to another within the media stream, such as a copyright identification bit, a copyright identification start, AAC frame length, and ADTS buffer fullness, etc. The fixed header contains information of the complete media stream that does not change throughout the media stream and is contained in every frame. As illustrated, the fixed header contains: the sync word 356 comprising 12 bits of 1's (0xFFF in hexadecimal); ID field 358 comprising 1 bit (where '0' represents ADTS); Layer field 360 comprising 2 bits (where '00' represents ADTS); Protection field 362 comprising 1 bit; Profile field 364 comprising 2 bits; Sampling frequency field 366 comprising 4 bits; Private bit field 368 comprising 1 bit; Channel configuration field 370 comprising 3 bits; Original/Copy field 372 comprising 1 bit; and Home field 374 comprising 1 bit.

In one embodiment, the media encoding formats 328, 344 and 354 in the format list 300 are stored or arranged in order based on a media frame size (i.e., frame length) associated with each media encoding format. For example, the media encoding formats 328, 344 and 354 in the format list 300 are arranged in order from smallest associated media frame size to largest associated media frame size, as shown in FIG. 3, whereby the formats on the list 300 are arranged in decreasing order of sync word frequency. This increases the speed of media encoding format identification.

Some media encoding formats are associated with fixed frame sizes (e.g., AC3) and some with variable frame sizes (e.g., mp3). Therefore, in an embodiment, the media frame size associated with each media encoding format (which is used to order the media encoding formats within the list) is a maximum frame size or a worst case frame size. In one example implementation, the media device 102 calculates the worst case media frame size using a suitable algorithm. For instance, the media device 102 calculates the worst case frame size for the mp3 format 328 as follows. The mp3 format 328 has the following parameters:

Minimum bit rate for MPEG-1, Layer-3=32000 bps=32 kbpss
Maximum bit rate for MPEG1, Layer-3=320000 bps=320 kbps
Maximum sampling frequency=48000 Hz=48 kHz
Minimum sampling frequency=32000 Hz=32 kHz
Padding bit can be 0 or 1.

An example formula to calculate the worst case frame size for the mp3 format 328 is: Worst case frame size=144*(Max Bit rate)/(Min Sampling frequency)+1, wherein the Max Bit rate is the maximum bit rate for the format, and Min Sampling frequency is the minimum sampling frequency for the format. Using this formula, the worst case frame size for mp3 format 328 is: 144*320000/32000+1=1441 bytes.

In another embodiment, the frame length is fixed and is indicated in the frame header. For example, AC3 format 344 has frame sizes that are fixed for different bit rates; and the header of each frame for this format includes a 16 bit word that indicates the frame length. For instance, for a 640 kbps and 32 kHz sampling frequency stream, the maximum frame size for the AC3 format 344 is 1920 words. With each word having a length of 16 bits, the frame size in the AC3 format 344 is 1920*2=3840 bytes. Similarly, the AAC-ADTS format 354 has frame sizes that are fixed for different bit rates; and the variable length header of each frame has a 13 bit word that indicates the frame size, which is about 8192 bytes.

Figure 4B:
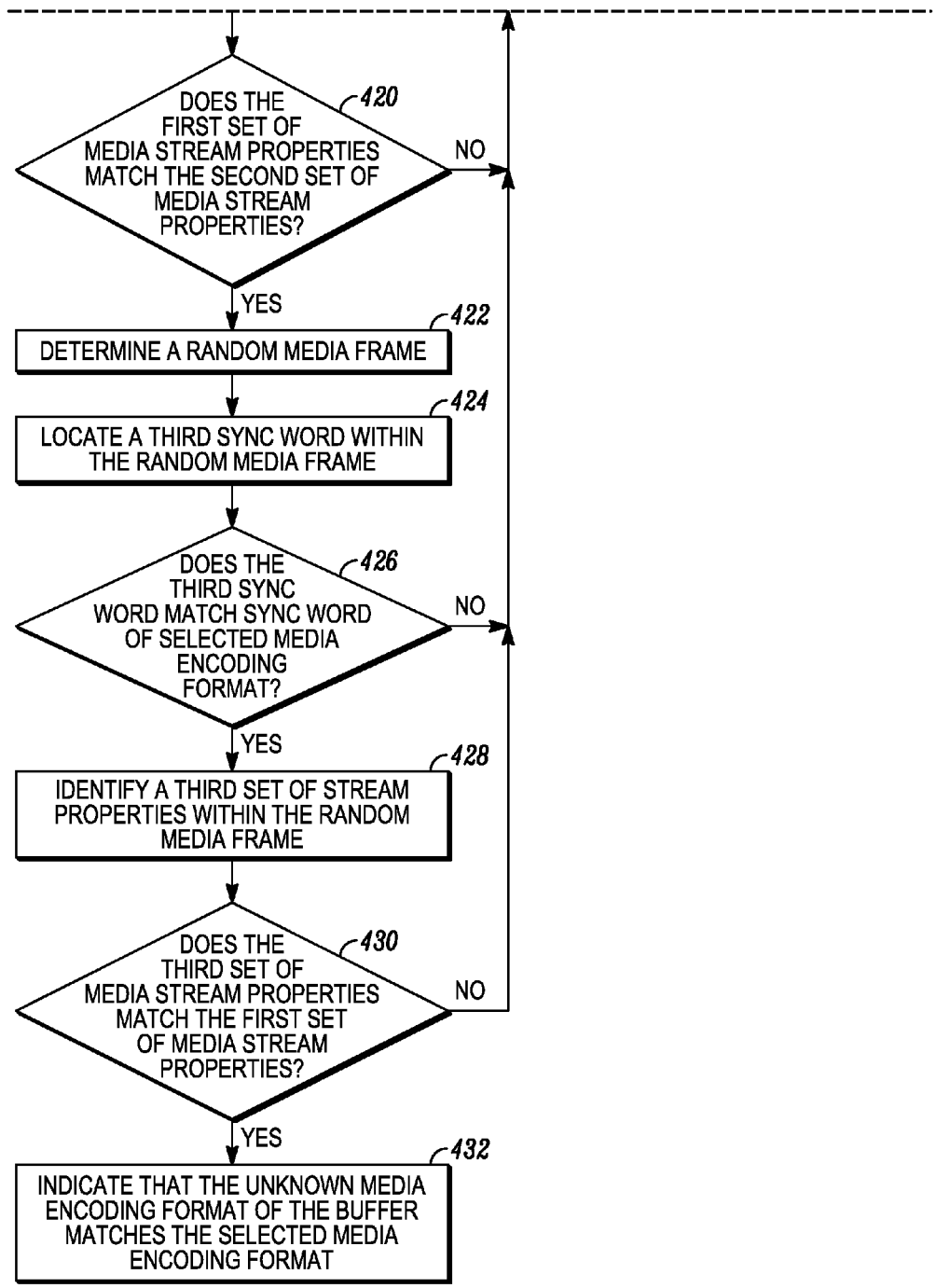
FIG. 4 is a flowchart of a process in accordance with some embodiments.

Turning now to FIG. 4, shown therein is a process 400 that is implemented to identify the unknown media encoding format of the media stream 124. In one embodiment, the processor 126, buffer 112, and network interface 110 implement the process 400. More particularly, at 402, the media device 102 receives the media stream 124 having the unknown media format from the server 106 via the network interface 110 and stores at least some of the frames of the media stream 124 (e.g., comprising the media stream portion 200) into the buffer 112.

The portion of the media stream 124 (i.e., the number of media frames) stored in the buffer 112 depends on the size of the media frames within the media stream and the size of the buffer. In one embodiment, the size of the buffer 112 is determined based on the largest frame size associated with all of the media encoding formats in the format list 300. For example, the buffer 112 has a size that is a multiple of a largest media frame size associated with the plurality of media encoding formats in the format list. Since the largest frame size associated with the formats stored in format list 300 is 8192 bytes, the size of the buffer 112 used to store the portion 200 of the media stream is a multiple of 8192, for example, ten times as large (i.e. 8192×10=81920 bytes). In this case, the portion 200 of the media stream 124 stored in the buffer 112 initially comprises frames 204-214.

At 404, the processor 126 accesses the format list 300 and selects a first media encoding format from the list. In one embodiment, selecting the first media encoding format comprises selecting a media encoding format with the smallest associated media frame size, which is this case is the mp3 format 328. In this manner, the processor 126 selects the media encoding format having the highest occurrence of sync words, which increases the speed of identifying the correct media encoding format of the media stream 124. Selecting the media encoding format includes, for instance, determining the sync word (e.g., 332) associated with the selected format 328 to use in a first pass of the process 400.

In general, the processor 126 compares sync words and media stream properties for a first plurality of media frames within the media stream 124 to determine whether there is a match to one of the media encoding formats stored in the format list. In an embodiment, the first plurality of media frames comprises a first two consecutive media frames within the buffer that include a sync word, and the first plurality of media frames further comprises a third media frame that is positioned within the buffer non-consecutively to the first two consecutive media frames. For example, the position of the third media frame within the buffer is based on a number that is a multiple of a media frame size associated with the selected (e.g., first) media encoding format.

More particularly, at 406, the processor 126 identifies (i.e., finds) the first sync word within the buffer 112, which in an embodiment is the sync word (e.g., 216) contained in the header of the first frame (e.g., 202) of the media stream portion 200 stored in the buffer 112. In order to locate the sync word, the processor determines the length of the frame based on the selected media encoding format 328. An example formula to calculate frame length for the mp3 format 328 is: Frame Length=144*Bit rate/Sampling frequency+padding; or the formula used to calculate the maximum frame length for the mp3 format. The frame length calculation defines a window of bytes within which to search for the sync word and to estimate boundaries between the multiple frames within the buffer 112. For example, for a particular format, to see if the buffer could contain that type of media, it is enough to search for the worst case frame size+1 for a sync word match for that format, as a first step.

At 408, the processor 126 compares the sync word 216 with the sync word 332 for the mp3 format 328 stored in the format list. If the two sync words match, the processor 126 identifies and stores (at 410) one or more stream properties (228) of the media frame 202. In one embodiment, the identified one or more stream properties 228 is stored in the memory 114 or the remote memory 116. The particular stream properties extracted and stored depend on factors including, but not limited to, the size of the stream property (the smaller in bit (or byte) size the stream property, the less storage required and faster comparisons can be made), the size of the buffer used to store such information, etc.

At 412, the processor 126 identifies a subsequent sync word out of the remaining frames 204-214 stored in the buffer 112. Calculating the frame length for media frame 202, enables the processor 126 to locate the start of the next media frame 204. In one embodiment, the processor 126 identifies an immediately subsequent sync word, which is the sync word in the frame 204 that immediately follows the frame 202. At 416, the processor 126 compares the sync word 218 of the frame 204 with the sync word 332 for the mp3 format 328 stored in the format list. If the two sync words match, the processor 126 identifies and extracts, at 418, the stream properties 230 from the media frame 204. In one embodiment, the identified stream properties 230 are stored in the memory 114 or the remote memory 116.

The processor 126 proceeds to compare the identified stream properties 228 with the identified stream properties 230, at 420. If the stream properties from the two frames match, the processor selects, at 422, a third (subsequent) media frame from the stored media frames 202-214. In one embodiment, to counter against intentional sabotage, corrupt data, network issues, etc., the processor 126 selects, at 422, a non-consecutive (or "random") media frame start position or location within the stored media frames. Calculating the frame length for the mp3 media format enables the processing device 126 to locate the start of this random frame and determine this random position within the stored media frames. In one embodiment, the processor 126 calculates the random position as a multiple of the frame size from the media encoding format under consideration, which in this case is a multiple of 1441 bytes for the mp3 format. In this example, the processor 126 selects frame 210 out of the remaining frames 206-214 stored in the buffer 112.

At 424, the processor 126 identifies the sync word 224 of the frame 210 and, at 426, compares the sync word 224 with the sync word 332 for the mp3 format 328. If the sync words match, the processor 126, at 428 and 430 respectively, identifies the stream properties 236 of the media frame 210 and compares the stream properties 236 to the stream properties 228 and/or 230 stored for media frames 202 and/or 204. In one embodiment, the identified stream properties 236 are stored in the memory 114 or the remote memory 116. If the stream properties match, the processor 126 determines, at 432, that the unknown media encoding format for the media stream 124 is the selected media encoding format, which in this case is the mp3 format 328. The processor 126 then instructs or configures one of the decoders 122 to decode the content of the media stream 124 (including the content 244-256 of the stored media frames 202-214) using the mp3 format to enable playback or presentation of the content to the user. It should be noted that the stream properties within the frames 202, 204, 210 were compared against each other during the process 400. In addition to this comparing, or alternative thereto, during the process 400 one or more of the stream properties within the frames 202, 204, 210 can be compared to the stored stream properties 338-342 for the mp3 format 328.

On the other hand, if the sync words from any of the selected media frames fail to match the sync word for the mp3 format (at 408, 416, or 426) or the stream properties don't match for any of the selected media frames (at 420 or 430), the process proceeds to 434. At 434, the processor 126 determines if there are additional media encoding formats in the format list 300. If there are additional formats in the format list, the processor 126, at 436, selects the next format in the list 300 (e.g., the format having the next smallest frame length or the next highest frequency of sync words) and repeats the process 400. Process 400 is repeated (beginning at 406) until the processor 126 either identifies the unknown media encoding format of the media stream 124 or the end of the format list 300 is reached. In the event the processor 126 fails to find a matching media encoding format from the format list 300, the processor indicates, at 438, an error or an inability to identify the media encoding format for the media stream 124. Such an indication can be made through an audio or visual indicator on the media device 102 or playback device 104.

Figure 5:
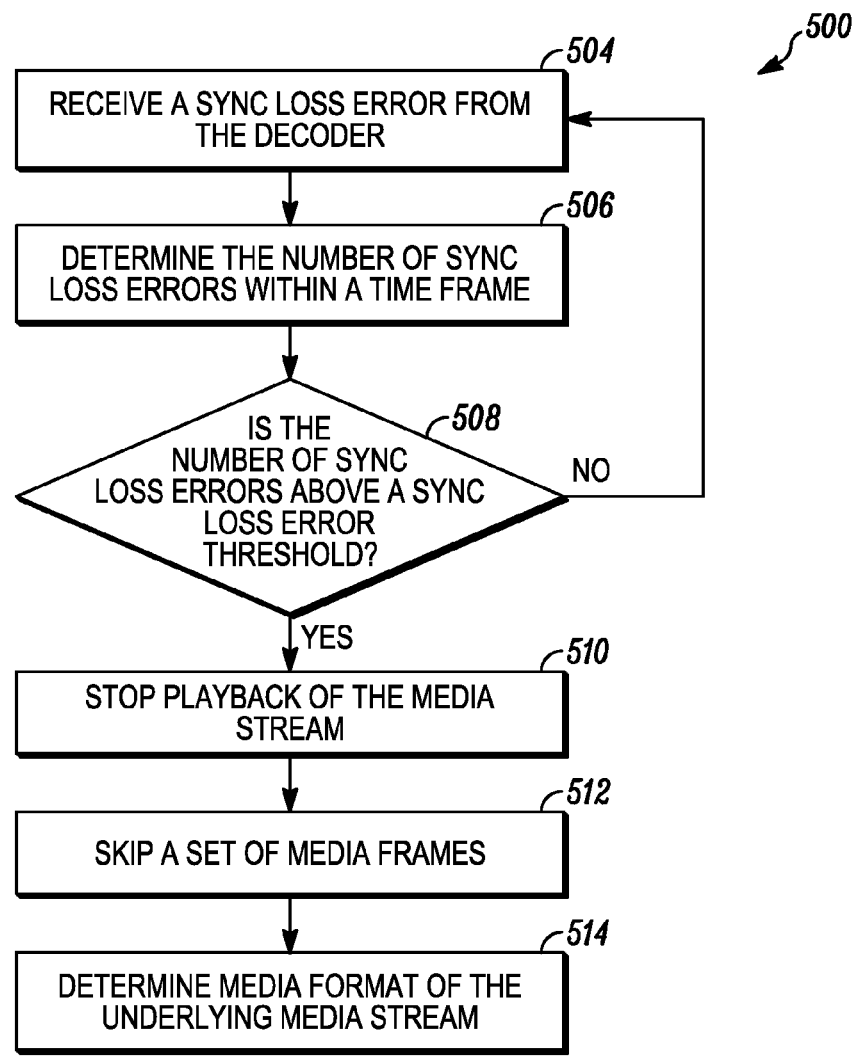
FIG. 5 is a flowchart of another process in accordance with some embodiments.

Even when the processor 126 identifies the media encoding format using the method 400, the one or more decoders 122 are sometimes unable to decode at least a portion of the media stream 124 due to midstream format change or data corruption (for instance due to sabotage, damage, etc.) of the one or more media frames within media stream 124 or any other issue that prevents the decoders 122 from decoding the media stream, such as network errors, sync byte emulation, etc. Referring now to FIG. 5, in one embodiment, the processor 124 implements a process 500 to manage media playback in the event the decoders 122 encounter issues that prevent decoding and playback of portions of the media stream 124. In general, in accordance with process 500, the determined media encoding format is associated with a decoder error threshold. The processor 126 is configured to receive a number of decoder error indications from the decoder device 122 that is decoding the media stream 124, and when the number of decoder error indications exceeds the decoder error threshold, the processor 126 re-determines the unknown media encoding format of the media stream 124.

More particularly, at 504, the processor 126 receives a sync loss error from the decoder 122 that is decoding the media stream 124, for instance, based on the media encoding format that the processor identified for the media stream using the process 400. A sync loss error (also referred to herein as a decoder error), as defined herein, is an error that prevents the decoder from decoding media for media playback. Example sync loss errors include, but are not limited to, errors occurring at the input of the decoder, the output of the decoder or during decoder processing.

Sync loss errors at the input of the decoder include, for instance, those due to: frequency tuner loss of lock; network loss of data; or input overflow if the rate of data received into the decoder for processing exceeds the maximum data rate associated with the media format. Sync loss errors at the output of the decoder include, for instance: continuous or persistent loss of audio/visual sync (e.g., timestamp mismatches), which might indicate that the format has changed (e.g., a midstream format change) or intentional data sabotage; or lack of data output by the decoder or underflow at the output of the decoder, which could indicate a wrong media encoding format (and hence decoder) selection. Sync loss errors during decoder processing include, for example, the decoder failing to continuously decode the media, which again could indicate a wrong media encoding format (and hence decoder) selection.

At 506, the processor 126 counts the number of sync loss errors received from the decoder 122. In an embodiment, the processor 126 has access to a counter that maintains a count of errors over a predetermined and fixed multiple of the frame duration associated with the media encoding format selected using process 400. At 508, the processor 126 compares the number of sync loss errors accumulated over the fixed multiple of the frame duration to a threshold number of sync loss errors.

In one embodiment, the threshold number of sync loss errors depends on the size or length of the media frames of the media stream 124; and, in a particular embodiment, the decoder error threshold is inversely related to a media frame size of the selected media encoding format. Accordingly, the larger the size of the media frame of the media stream 124, the fewer sync loss errors are required before the processor 126 instructs the playback device to stop playing the compromised media stream 124, including muting the audio media.

For example, if the media stream 124 is encoded using the AAC-ADTS format 354, the media frames of the media stream 124 are 8192 bytes long. This means that with three consecutive sync loss errors there is over 24 KB (8192×3=24,576 bytes) of corrupted data in the media stream 124. On the other hand, if the media stream 124 is encoded using, for example, the mp3 format 328, the media frames of the media stream 124 are 1441 bytes long. This means that with even ten consecutive sync loss errors there is less than 15 KB (1441×3=14,410 bytes) of corrupted data in the media stream 124. Thus, if frames of a larger size are lost, presentation artifacts are more pronounced compared to loosing frames of a smaller size.

If the number of accumulated decoder errors is less than the error threshold, the process 500 returns to block 504 until a next decoder error is received. However, if the number of accumulated decoder errors exceeds the error threshold, the processor 126 stops playback of the media stream 124, at 510 and initiates a recovery sequence beginning at 512. Namely, the processor 126 skips forward a number of media frames within the buffer 112 from a last decoded media frame to begin re-determining of the unknown media encoding format of the media stream 124, at 514, using the process 400. In one illustrative implementation, the processor 126 again selects the format at the top of the list 300 to begin the sync word and stream property comparisons. Selecting a format having a different position within the format list 300 is also possible. After the processor 126 re-determines the format of the media stream 124, the selected decoder 122 resumes decoding the remaining portion of the media stream 124 for user playback. Alternatively, in another embodiment, if the number of accumulated decoder errors exceeds the error threshold, the processor 126 stops playback of the media stream 124, at 510, and initiates a recovery sequence beginning at 514 (by skipping step 512) when two or more encoding formats are used to encode the media stream 124. After stopping the playback, at 510, a new format is determined beginning at 514.

In one embodiment, the processor 126 skips over a predetermined number of media frames stored in the buffer 112. For example, the predetermined number of media frames comprises a multiple of the media frame size for the currently selected media encoding format. In either of these embodiments, the larger the size of the media frames being skipped, the fewer media frames should be skipped by the processor 126. As described above, if the media stream 200 is encoded using AAC-ADTS format 154, skipping three consecutive media frames results in skipping over 24 KB (8192×3=24,576 bytes) of data in the media stream 124. On the other hand, if the media stream 124 is encoded using the mp3 format 128, skipping ten consecutive media frames results in skipping less than 15 KB (1441×3=14,410 bytes) of data in the media stream 124. In view of this, in one embodiment the processor 126 skips more media frames for the media stream 124 comprising smaller size media frames, and the processor 126 skips fewer media frames for the media stream 124 comprising larger size media frames.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   storing a portion of a media stream having an unknown media encoding format within a buffer, wherein the portion comprises multiple media frames, and wherein the media frames in the portion each comprise a sync word;
   selecting a first media encoding format from multiple media encoding formats, wherein the first media encoding format is associated with a first sync word;
   comparing a sync word from each media frame in the media frames to the first sync word;
   in response to determining that the sync word from each media frame in the media frames matches the first sync word, comparing, by a processing device, a media stream property from each media frame in the media frames to media stream properties from each other media frame in the media frames, wherein each media stream property comprises information other than the sync word that does not change for ones of the media frames having the unknown media encoding format; and
   in response to determining that the media stream property from each media frame matches the media stream properties from each other media frame, identifying the unknown media encoding format as the first media encoding format.

2. The method of claim 1, wherein the media encoding formats are arranged in order based on a media frame size associated with each media encoding format.

3. The method of claim 2, wherein the media encoding formats are arranged in order from a smallest associated media frame size to a largest associated media frame size.

4. The method of claim 3, wherein selecting the first media encoding format comprises selecting a media encoding format with the smallest associated media frame size.

5. The method of claim 1, wherein the media frames comprise a first two consecutive media frames within the buffer that comprise a sync word.

6. The method of claim 5, wherein the media frames further comprise a third media frame that has a position within the buffer that is non-consecutive to the first two consecutive media frames.

7. The method of claim 6, wherein the position of the third media frame within the buffer is based on a number that is a multiple of a media frame size associated with the first media encoding format.

8. The method of claim 1, wherein the buffer has a size that is a multiple of a largest media frame size associated with the media encoding formats.

9. The method of claim 1, wherein the first media encoding format is associated with a decoder error threshold, and wherein the method further comprises:
   receiving a number of decoder error indications from a decoder device that decodes the media stream; and
   in response to determining that the number of decoder error indications exceeds the decoder error threshold, identifying the unknown media encoding format again.

10. The method of claim 9, wherein the decoder error threshold is inversely related to a media frame size of the first media encoding format.

11. The method of claim 9 further comprising skipping forward a number of media frames within the buffer from a last decoded media frame to begin identifying the unknown media encoding format again.

12. The method of claim 1, wherein the media stream is a video stream.

13. The method of claim 1, wherein the media stream is an audio stream.

14. The method of claim 1, wherein the media stream is a video and audio stream.

15. A media device for comprising:
   a network interface configured to communicate with a server to receive a media stream having an unknown media encoding format;
   a buffer coupled to the network interface and configured to store a portion of the media stream, wherein the portion comprises multiple media frames, and wherein the media frames in the portion each comprise a sync word;
   a processing device coupled to the buffer and configured to:
      select a first media encoding format from multiple media encoding formats, wherein the first media encoding format is associated with a first sync word;
      compare a sync word from each media frame in the media frames to the first sync word;
      in response to the determination that the sync word from each media frame in the media frames matches the first sync word, compare a media stream property from each media frame in the media frames to media stream properties from each other media frame in the media frames, wherein each media stream property comprises information other than the sync word that does not change for ones of the media frames having the unknown media encoding format; and in response to the determination that the media stream property from each media frame matches the media stream properties from each other media frame, identify the unknown media encoding format as the first media encoding format; and decode the media frames encoded with the first media encoding format.

16. The media device of claim 15, wherein the processing device is further configured to decode media frames encoded with a second media encoding format.

17. The media device of claim 15, wherein the media device is a television.

18. The media device of claim 15, wherein the media device is a set-top box.

19. A non-transient computer-readable storage medium having instructions stored thereon that, when executed by a processing device, cause the processing device to perform operations comprising:

storing a portion of a media stream having an unknown media encoding format within a buffer, wherein the portion comprises multiple media frames, and wherein the media frames in the portion each comprise a sync word;

selecting a first media encoding format from multiple media encoding formats, wherein the first media encoding format is associated with a first sync word;

comparing a sync word from each media frame in the media frames to the first sync word;

in response to determining that the sync word from each media frame in the media frames matches the first sync word, comparing, by the processing device, a media stream property from each media frame in the media frames to media stream properties from each other media frame in the media frames, wherein each media stream property comprises information other than the sync word that does not change for ones of the media frames having the unknown media encoding format; and in response to determining that the media stream property from each media frame matches the media stream properties from each other media frame, identifying the unknown media encoding format as the first media encoding format.

20. The non-transient computer-readable storage medium of claim 19, wherein the media frames comprise a first two consecutive media frames within the buffer that comprise a sync word and a third media frame that has a position within the buffer that that is non-consecutive to the first two consecutive media frames.

* * * * *